US012005955B2

(12) United States Patent
Helfrich et al.

(10) Patent No.: US 12,005,955 B2
(45) Date of Patent: Jun. 11, 2024

(54) METHOD OF REDUCING OR PREVENTING LATERAL OSCILLATIONS OF CONNECTED VEHICLE UNIT, CONTROL SYSTEM, STEERING SYSTEM, LEADING VEHICLE UNIT, AND VEHICLE COMBINATION (71) Applicant: Volvo Truck Corporation, Gothenburg (SE)

(72) Inventors: Thorsten Helfrich, Gothenburg (SE); Leon Henderson, Härryda (SE)

(73) Assignee: Volvo Truck Corporation, Gothenburg (SE)

( * ) Notice: Subject to any disclaimer, the term of this patent is extended or adjusted under 35 U.S.C. 154(b) by 194 days.

(21) Appl. No.: 17/501,083

(22) Filed: Oct. 14, 2021

(65) Prior Publication Data

US 2022/0126917 A1    Apr. 28, 2022

(30) Foreign Application Priority Data

Oct. 23, 2020 (EP) ..................................... 20203646

(51) Int. Cl.
*B62D 15/02* (2006.01)
*B62D 6/00* (2006.01)

(52) U.S. Cl.
CPC ........... *B62D 15/025* (2013.01); *B62D 6/008* (2013.01)

(58) Field of Classification Search
CPC ...... B62D 15/025; B62D 6/008; B62D 13/00; B62D 12/02; B62D 15/029; B60D 1/30; B60D 1/62
See application file for complete search history.

(56) References Cited

U.S. PATENT DOCUMENTS 7,086,660 B2 * 8/2006 Bruening ............. B62D 13/025
280/442
8,311,693 B2 * 11/2012 Wu ..................... B60T 8/17555
303/157

(Continued)

FOREIGN PATENT DOCUMENTS

CN    103328284 A    9/2013
CN    108473117 A    8/2018

(Continued)

OTHER PUBLICATIONS

S. Kharrazi, J. Fredriksson and M. Lidberg, "Lateral stability control of a long heavy vehicle combination by active steering of the towed units," 13th International IEEE Conference on Intelligent Transportation Systems, Funchal, Portugal, 2010, pp. 168-173, doi: 10.1109/ITSC.2010.5625237. (Year: 2010).*

(Continued)

*Primary Examiner* — Khoi H Tran
*Assistant Examiner* — Christopher Scott
(74) *Attorney, Agent, or Firm* — Withrow & Terranova, PLLC (57) ABSTRACT

The invention relates to a method of reducing or preventing lateral oscillations of at least one connected vehicle unit of a vehicle combination, the method comprising providing one or more parameters associated with a setup of the vehicle combination; determining, based on the one or more parameters, one or more critical frequencies having critical rearward amplification of a motion variable between the leading vehicle unit and the at least one connected vehicle unit; monitoring a steering input to the leading vehicle unit; determining whether the steering input excites any of the one or more critical frequencies; and automatically triggering a countermeasure for reducing or preventing lateral oscillations of the at least one connected vehicle unit upon (Continued)

determining that the steering input excites any of the one or more critical frequencies.

28 Claims, 5 Drawing Sheets

(56) References Cited

U.S. PATENT DOCUMENTS

| | | | |
|---|---|---|---|
| 11,099,579 | B2* | 8/2021 | Goudy ............ G08G 1/096708 |
| 2005/0206229 | A1 | 9/2005 | Lu et al. |
| 2015/0165850 | A1 | 6/2015 | Chiu et al. |
| 2015/0367844 | A1 | 12/2015 | Tagesson et al. |

FOREIGN PATENT DOCUMENTS

| | | | |
|---|---|---|---|
| DE | 102004045127 A1 | 3/2006 |
| DE | 102015110697 A1 | 1/2016 |
| DE | 102014216183 A1 | 2/2016 |
| EP | 0358973 A1 | 3/1990 |
| EP | 0358973 A3 | 8/1991 |
| EP | 2433839 A1 | 3/2012 |
| WO | 2008148635 A1 | 12/2008 |

OTHER PUBLICATIONS

Extended European Search Report for European Patent Application No. 20203646.3, dated Apr. 6, 2021, 5 pages.
First Office Action for Chinese Patent Application No. 202111216880.2, mailed Feb. 5, 2024, 9 pages.

* cited by examiner

METHOD OF REDUCING OR PREVENTING LATERAL OSCILLATIONS OF CONNECTED VEHICLE UNIT, CONTROL SYSTEM, STEERING SYSTEM, LEADING VEHICLE UNIT, AND VEHICLE COMBINATION

RELATED APPLICATION

The present application claims priority to European Patent Application No. 20203646.3, filed on Oct. 23, 2020, and entitled "METHOD OF REDUCING OR PREVENTING LATERAL OSCILLATIONS OF CONNECTED VEHICLE UNIT, CONTROL SYSTEM, STEERING SYSTEM, LEADING VEHICLE UNIT AND VEHICLE COMBINATION," which is incorporated herein by reference in its entirety.

TECHNICAL FIELD

The invention relates to a method of reducing or preventing lateral oscillations of at least one connected vehicle unit of a vehicle combination comprising the at least one connected vehicle unit connected to a leading vehicle unit, a control system for reducing or preventing lateral oscillations of at least one connected vehicle unit of a vehicle combination comprising the at least one connected vehicle unit connected to a leading vehicle unit, a steering system comprising a control system, a leading vehicle unit comprising a control system, and a vehicle combination comprising a leading vehicle unit and at least one connected vehicle unit.

The invention is applicable to heavy-duty vehicles, such as heavy vehicle combinations, buses and construction equipment. Although the invention will be described mainly with respect to an A-Double (Truck-Semitrailer-Dolly-Semitrailer), the invention is not restricted to this particular vehicle combination, but may be used in various vehicle combinations where there is a risk for lateral oscillation of at least one connected vehicle unit.

BACKGROUND

A long vehicle combination may comprise a leading vehicle unit, such as a tractor, and one or more connected vehicle units, such as trailers, dollies and/or semitrailers, connected to the leading vehicle unit. Long vehicle combinations have potential advantages such as improved fuel efficiency and reduced total cost of ownership per ton of unit freight. On the other hand, long vehicle combinations are more prone to lateral instability that may cause accidents, for example involving trailer rollover, jack-knifing and trailer swinging. The lateral instability may be caused by rearward amplification of a motion variable between the leading vehicle unit and the one or more connected vehicle units. The amplification of lateral motions at the connected vehicle units may be caused by a time delay between the steering input and generation of lateral forces at the connected vehicle units, which causes yaw motions of the connected vehicle units and may consequently lead to side slip and off tracking. The last connected vehicle unit may for example leave a lane sideways during a lane change since a lateral oscillation of the connected vehicle unit is not known and cannot be directly felt by the driver. In some cases, experienced drivers know how the vehicle combination behaves and may avoid steering inputs that excite critical lateral oscillations. However, accidents caused by such lateral oscillations still happen, e.g. due to an unknown setup of the vehicle combination and/or due to evasive maneuvering. Solutions for dampening upcoming lateral oscillations in a long vehicle combination exist. Such solutions may for example comprise braking or steering the vehicle combination.

SUMMARY

An object of the invention is to improve safety in a vehicle combination comprising one or more connected vehicle units connected to a leading vehicle unit.

According to a first aspect, the object is achieved by a method of reducing or preventing lateral oscillations of at least one connected vehicle unit of a vehicle combination comprising the at least one connected vehicle unit connected to a leading vehicle unit according to claim 1. The method comprises providing one or more parameters associated with a setup of the vehicle combination. The method further comprises determining, based on the one or more parameters, one or more critical frequencies having critical rearward amplification of a motion variable between the leading vehicle unit and the at least one connected vehicle unit; monitoring a steering input to the leading vehicle unit; determining whether the steering input excites any of the one or more critical frequencies; and automatically triggering a countermeasure for reducing or preventing lateral oscillations of the at least one connected vehicle unit upon determining that the steering input excites any of the one or more critical frequencies.

By means of the countermeasure, certain types of steering inputs exciting the one or more critical frequencies can be avoided. By avoiding such steering inputs, also critical excitations of the vehicle combination can be avoided to thereby reduce or prevent lateral oscillations of the at least one connected vehicle unit before these occur, i.e. very early in a chain of events potentially leading to an accident of the vehicle combination. The method thereby proactively reduces or prevents lateral oscillations rather than reactively reducing or preventing lateral oscillations. Avoiding steering inputs causing undesirable excitations can be more effective than reacting on a large rearward amplification situation. The method may however additionally comprise various reactive measures for reducing or preventing lateral oscillations, such as reactive steering or braking measures. The present invention utilizes a changed steering input behavior of the driver or of an autonomous driving system to influence the motion of the vehicle combination in order to reduce or prevent lateral oscillations of the at least one connected vehicle unit. In this way, the lateral stability of the vehicle combination, and consequently safety of the vehicle combination, can be improved.

The vehicle combination may comprise a plurality of connected vehicle units. In this case, the method may comprise determining, based on the one or more parameters, one or more critical frequencies having critical rearward amplification of a motion variable between the leading vehicle unit and one, several or each of the connected vehicle units. The critical frequencies having critical rearward amplification are typically different between the leading vehicle unit and each unique connected vehicle unit.

Examples of parameters associated with a setup of the vehicle combination may include a number of connected vehicle units, wheelbase data of each connected vehicle unit (e.g. a distance to each wheel axle from a wheel axle of the leading vehicle unit), wheel axle load(s) of each connected vehicle unit, and/or whether one or more wheel axles are lifted from the ground), a total length of the vehicle combination, a coupling position of each pair of adjacent connected vehicle units, a coupling position between the leading vehicle unit and a first connected vehicle unit, dimensions of the leading vehicle unit, dimensions of the at least one connected vehicle unit, mass of the leading vehicle unit, mass of the at least one connected vehicle unit, mass of cargo in the at least one connected vehicle unit, position of a center of gravity of the at least one connected vehicle unit etc. The parameters are thus related to a configuration of the vehicle combination and may therefore be referred to as combination parameters. The parameters may be electronically and automatically communicated from the connected vehicle unit to the leading vehicle unit upon connection of the connected vehicle unit. Alternatively, or in addition, the parameters may be manually input by a driver, e.g. by means of a touch screen in the leading vehicle. For an autonomous driving system, the parameters may come from the cloud or an off-board system. Alternative ways of providing the one or more parameters are conceivable.

The one or more critical frequencies may comprise one or more ranges of critical frequencies. The determination of the one or more critical frequencies based on the one or more parameters may be made by means of calculations using a model of the vehicle combination. The calculations may be carried out either on-board (e.g. in a control system of the vehicle combination) or off-board (e.g. in the cloud). To investigate the effect of the steering input frequency on the performance of the vehicle combination and to find the critical frequencies, the frequency responses of a model (e.g. a linear model) of the vehicle combination can be studied in the frequency range of interest. The rearward amplification may be determined based on the leading vehicle unit's response gain in the frequency domain.

Alternatively, or in addition, the determination of the one or more critical frequencies based on the one or more parameters may be made by means of signal analysis while driving, by means of a look-up table, or by retrieval from the cloud. Alternative ways of determining the one or more critical frequencies based on the one or more parameters are conceivable.

The rearward amplification describes how a motion variable of the leading vehicle unit is amplified to a particular connected vehicle unit. For most vehicle combinations, the rearward amplification implies that a quantity of a motion variable of a connected vehicle unit is larger than the corresponding motion variable of the leading vehicle unit. The rearward amplification generally increases with an increased length of the vehicle combination and with a number of connected vehicle units. In some cases, the rearward amplification is generally largest between the leading vehicle unit and the rearmost connected vehicle unit.

The rearward amplification is dependent on a frequency of a steering input, e.g. a maneuver of a steering wheel by a driver of the leading vehicle unit. The rearward amplification is also dependent on the setup of the vehicle combination. A large rearward amplification for a particular steering input frequency means that the steering input, e.g. by a driver via a steering wheel, has a large influence on lateral oscillations of the connected vehicle unit.

The monitoring of the steering input may comprise continuously monitoring the steering input during travel of the vehicle combination. Alternatively, or in addition, the steering input may be determined based on data from a steering angle sensor, e.g. associated with a steering wheel. For an autonomous driving system, the steering input may be a steering signal generated by a computer program, e.g. a "planner" or a "path follower" of the leading vehicle unit.

Throughout the present disclosure, an autonomous driving system may be level 3 (conditional driving automation) or higher.

The determination of whether the steering input excites any of the one or more critical frequencies may be made using a detection algorithm and/or a bandpass filter having a bandwidth corresponding to the one or more critical frequencies. For example, the steering input (e.g. movements of a steering wheel) may be analyzed to detect excitations within a critical frequency range by means of a bandpass filter with thresholds on a steering angle or steering angle rate. Information from the detection algorithm may be used to also activate other systems in the vehicle combination to counteract lateral oscillations, such as reactive brake systems or steering systems.

The leading vehicle unit may for example be a tractor or a truck. The at least one connected vehicle unit may comprise one or more trailers, one or more semitrailers and/or one or more dollies. A connected vehicle unit may also be an E-dolly, i.e. a dolly comprising an electric propulsion system. Each connected vehicle unit may comprise at least one wheel axle. The leading vehicle unit may be articulated about a first vertical axis to a first following connected vehicle unit. A second connected vehicle unit may be articulated about a second vertical axis to a second following connected vehicle unit etc. The leading vehicle unit and the one or more connected vehicle units thus form a train of articulated bodies.

According to one embodiment, the critical rearward amplification is defined as a rearward amplification ratio of at least 1.1, such as at least 1.3, such as at least 1.5, between the at least one connected vehicle unit and the leading vehicle unit. Alternatively, or in addition, the critical rearward amplification may be defined in dependence of a height of a center of gravity of each of the at least one connected vehicle unit. If the center of gravity is vertically below a center of gravity threshold value, critical rearward amplifications may be defined as higher than a first rearward amplification value, and if the center of gravity is vertically above the center of gravity threshold, critical rearward amplifications may be defined as higher than a second rearward amplification value, smaller than the first rearward amplification value. For example, if the last connected vehicle unit has a low center of gravity, the critical rearward amplification may be defined as a rearward amplification ratio of at least 1.5, but if the last connected vehicle unit has a high center of gravity (and can easily roll over), the critical rearward amplification may be defined as a rearward amplification ratio of at least 1.1.

In case the vehicle combination comprises a plurality of connected vehicle units, a unique critical rearward amplification may be defined for each connected vehicle unit. Accordingly, for each unique critical rearward amplification, a unique set of critical frequencies may be determined. Thus, for multiple connected vehicle units, different allowable rearward amplifications may be set for each connected vehicle unit. In this way, a range of steering input frequencies can be divided into different modes. For example, a first range of steering input frequencies that excite critical frequencies having critical rearward amplification to a first connected vehicle unit may be referred to as a first mode, and a second range of steering input frequencies that excite critical frequencies having critical rearward amplification to a second connected vehicle unit may be referred to as a second mode etc. In this way, each mode can be penalized differently depending on which connected vehicle unit is caused to have large lateral oscillation in that mode.

According to one embodiment, the motion variable is lateral movement, lateral acceleration, yaw, yaw rate, roll angle or roll rate. Rearward amplification is most commonly defined based on yaw rate or lateral acceleration.

According to one embodiment, at least one of the one or more parameters is associated with a geometry of the vehicle combination. Examples of such parameters include a number of connected vehicle units, wheelbase data of each connected vehicle unit (e.g. a distance to each wheel axle from a wheel axle of the leading vehicle unit), wheel axle load(s) of each connected vehicle unit, a total length of the vehicle combination, a coupling position of each pair of adjacent connected vehicle units, a coupling position between the leading vehicle unit and a first connected vehicle unit, dimensions of the leading vehicle unit, dimensions of the at least one connected vehicle unit, and a position of a center of gravity of the at least one connected vehicle unit.

According to one embodiment, the method further comprises determining stability information of the vehicle combination based on the one or more parameters. The stability information may include data associated with the critical frequencies, such as a frequency response diagram, a maximum rearward amplification and/or a general stability value. The general stability value may be binary (good or bad), e.g. depending on whether or not the maximum rearward amplification exceeds a threshold value.

According to one embodiment, the countermeasure comprises communicating the stability information to a driver or to an autonomous driving system of the leading vehicle unit. In order to communicate the stability information to the driver, the method may comprise visualizing the stability information to the driver, e.g. on a display. By means of the stability information, the driver can better learn the behavior of the vehicle combination and thereby avoid or reduce steering inputs exciting any of the one or more critical frequencies. The method may for example further comprise issuing a warning to the driver if the stability information indicates that very large rearward amplifications potentially can arise. A very large rearward amplification may be defined as a rearward amplification ratio of at least 1.5 between the at least one connected vehicle unit and the leading vehicle unit. For an autonomous driving system, the stability information may be used to improve a model of the vehicle combination and/or to penalize or filter out steering inputs exciting the one or more critical frequencies.

According to one embodiment, the method further comprises determining a maximum speed of the vehicle combination based on the one or more critical frequencies. According to one embodiment, the countermeasure comprises communicating the maximum speed to a driver or to an autonomous driving system of the leading vehicle unit, or warning the driver if a current speed of the leading vehicle unit exceeds the maximum speed. In order to communicate the maximum speed to the driver, the method may comprise visualizing the maximum speed to the driver, e.g. on a display. The maximum speed may also be communicated to the driver upon coupling a connected vehicle unit to the leading vehicle unit. Alternatively, the maximum speed may be used by an autonomous driving system of the leading vehicle unit.

According to one embodiment, the method further comprises determining a maximum steering angle for a given speed of the vehicle combination based on the one or more critical frequencies. According to one embodiment, the countermeasure comprises communicating the maximum steering angle at the given speed to a driver or to an autonomous driving system of the leading vehicle unit, or warning the driver if the current steering angle of the leading vehicle unit exceeds the maximum steering angle at the given speed. In order to communicate the maximum steering angle for a given speed to the driver, the method may comprise visualizing the maximum steering angle for the given speed to a driver, for example on a display or by means of lights on a steering wheel of the leading vehicle unit. In the latter case, the steering wheel may for example generate a green light from an arc within the maximum steering angle and a red light from two arcs outside the green arc. The maximum steering angle for a given speed may also be communicated to the driver upon coupling a connected vehicle unit to the leading vehicle unit. Alternatively, or in addition, force feedback may be generated in a steering wheel of the leading vehicle unit if the current steering angle of the leading vehicle unit exceeds the maximum steering angle at the given speed. Alternatively, the maximum steering angle for a given speed may be used by an autonomous driving system of the leading vehicle unit.

According to one embodiment, the countermeasure comprises a force feedback to a steering wheel of the leading vehicle unit. By means of the force feedback in the steering wheel, the driver is notified that the steering input excites a critical frequency having a critical rearward amplification. The driver may change a steering input of an ongoing maneuver in response to the force feedback and/or better learn the behavior of the vehicle combination by the force feedback in order to reduce or prevent lateral oscillations. The force feedback in the steering wheel is very intuitive to the driver. Therefore, the force feedback is an effective measure of preventing or reducing lateral oscillations of the vehicle combination.

According to one embodiment, the countermeasure comprises disabling a supporting steering torque. By disabling the supporting steering torque during a maneuver where a steering input excites a critical frequency having a critical rearward amplification, the steering input will change and thereby damp lateral oscillations of the at least one connected vehicle unit. The driver's ability to provide steering inputs exciting a critical frequency can be prevented or reduced in this way. Also, the disablement of the supporting steering torque is very intuitive to the driver. Therefore, the disablement of the supporting steering torque is an effective measure of preventing or reducing lateral oscillations of the vehicle combination.

According to one embodiment, the countermeasure comprises actively generating a counteracting steering torque that counteracts the steering input. By actively generating the counteracting steering torque during a maneuver where a steering input excites a critical frequency having a critical rearward amplification, the driver's ability to provide steering inputs exciting a critical frequency can be prevented or reduced. Also, the actively generated counteracting steering torque is very intuitive to the driver. Therefore, the actively generated counteracting steering torque is an effective measure of preventing or reducing lateral oscillations of the vehicle combination. In order to provide a counteracting steering torque, an electric motor connected to a hydromechanical steering gear giving an additional torque to the steering gear may be used.

According to a second aspect, the object is achieved by a control system for reducing or preventing lateral oscillations of at least one connected vehicle unit of a vehicle combination comprising the at least one connected vehicle unit connected to a leading vehicle unit. The control system comprises at least one data processing device and at least one memory having a computer program stored thereon, the computer program comprising program code which, when executed by the at least one data processing device, causes the at least one data processing device to perform the step of providing one or more parameters associated with a setup of the vehicle combination. The computer program further comprises program code which, when executed by the at least one data processing device, causes the at least one data processing device to perform the steps of determining, based on the one or more parameters, one or more critical frequencies having critical rearward amplification of a motion variable between the leading vehicle unit and the at least one connected vehicle unit; monitoring a steering input to the leading vehicle unit; determining whether the steering input excites any of the one or more critical frequencies; and automatically triggering a countermeasure for reducing or preventing lateral oscillations of the at least one connected vehicle unit upon determining that the steering input excites any of the one or more critical frequencies.

According to one embodiment, the critical rearward amplification is defined as a rearward amplification ratio of at least 1.1, such as at least 1.3, such as at least 1.5, between the at least one connected vehicle unit and the leading vehicle unit.

According to one embodiment, the motion variable is lateral movement, lateral acceleration, yaw, yaw rate, roll angle or roll rate.

According to one embodiment, at least one of the one or more parameters is associated with a geometry of the vehicle combination.

According to one embodiment, the computer program comprises program code which, when executed by the at least one data processing device, causes the at least one data processing device to perform the step of determining stability information of the vehicle combination based on the one or more parameters. According to one embodiment, the computer program comprises program code which, when executed by the at least one data processing device, causes the at least one data processing device to perform the step of commanding communication of the stability information to a driver or to an autonomous driving system of the leading vehicle unit. This communication of the stability information constitutes one example of a countermeasure.

According to one embodiment, the computer program comprises program code which, when executed by the at least one data processing device, causes the at least one data processing device to perform the step of determining a maximum speed of the vehicle combination based on the one or more critical frequencies. According to one embodiment, the computer program comprises program code which, when executed by the at least one data processing device, causes the at least one data processing device to perform the step of commanding communication of the maximum speed to a driver or to an autonomous driving system of the leading vehicle unit, or commanding issuance of a warning to the driver, if a current speed of the leading vehicle unit exceeds the maximum speed. This communication of the maximum speed constitutes one example of a countermeasure.

According to one embodiment, the computer program comprises program code which, when executed by the at least one data processing device, causes the at least one data processing device to perform the step of determining a maximum steering angle for a given speed of the vehicle combination based on the one or more critical frequencies. According to one embodiment, the computer program comprises program code which, when executed by the at least one data processing device, causes the at least one data processing device to perform the step of commanding communication of the maximum steering angle at the given speed to a driver or to an autonomous driving system of the leading vehicle unit, or commanding issuance of a warning to the driver, if the current steering angle of the leading vehicle unit exceeds the maximum steering angle at the given speed. This communication of the maximum steering angle for a given speed constitutes one example of a countermeasure.

The invention also relates to a steering system. The steering system comprises a control system according to the present disclosure.

According to one embodiment, the steering system further comprises a steering wheel and a steering assistance unit arranged to exert an assisting steering torque on the steering wheel. The steering system may be of any type according to the present disclosure.

According to one embodiment, the computer program comprises program code which, when executed by the at least one data processing device, causes the at least one data processing device to perform the step of commanding the steering assistance unit to issue a force feedback to the steering wheel upon determining that the steering input excites any of the one or more critical frequencies.

According to one embodiment, the computer program comprises program code which, when executed by the at least one data processing device, causes the at least one data processing device to perform the step of commanding the steering assistance unit to disable a supporting steering torque upon determining that the steering input excites any of the one or more critical frequencies.

According to one embodiment, the computer program comprises program code which, when executed by the at least one data processing device, causes the at least one data processing device to perform the step of commanding the steering assistance unit to actively generate a counteracting steering torque that counteracts the steering input upon determining that the steering input excites any of the one or more critical frequencies.

The invention also relates to a leading vehicle unit comprising a control system according to the present disclosure or a steering system according to the present disclosure. The leading vehicle unit may be of any type according to the present disclosure.

The invention also relates to a vehicle combination comprising a leading vehicle unit according to the present disclosure and at least one connected vehicle unit. Each connected vehicle unit may be of any type according to the present disclosure.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

In the following, a method of reducing or preventing lateral oscillations of at least one connected vehicle unit of a vehicle combination comprising the at least one connected vehicle unit connected to a leading vehicle unit, a control system for reducing or preventing lateral oscillations of at least one connected vehicle unit of a vehicle combination comprising the at least one connected vehicle unit connected to a leading vehicle unit, a steering system comprising a control system, a leading vehicle unit comprising a control system, and a vehicle combination comprising a leading vehicle unit and at least one connected vehicle unit, will be described. The same reference numerals will be used to denote the same or similar structural features.

Figure 1:
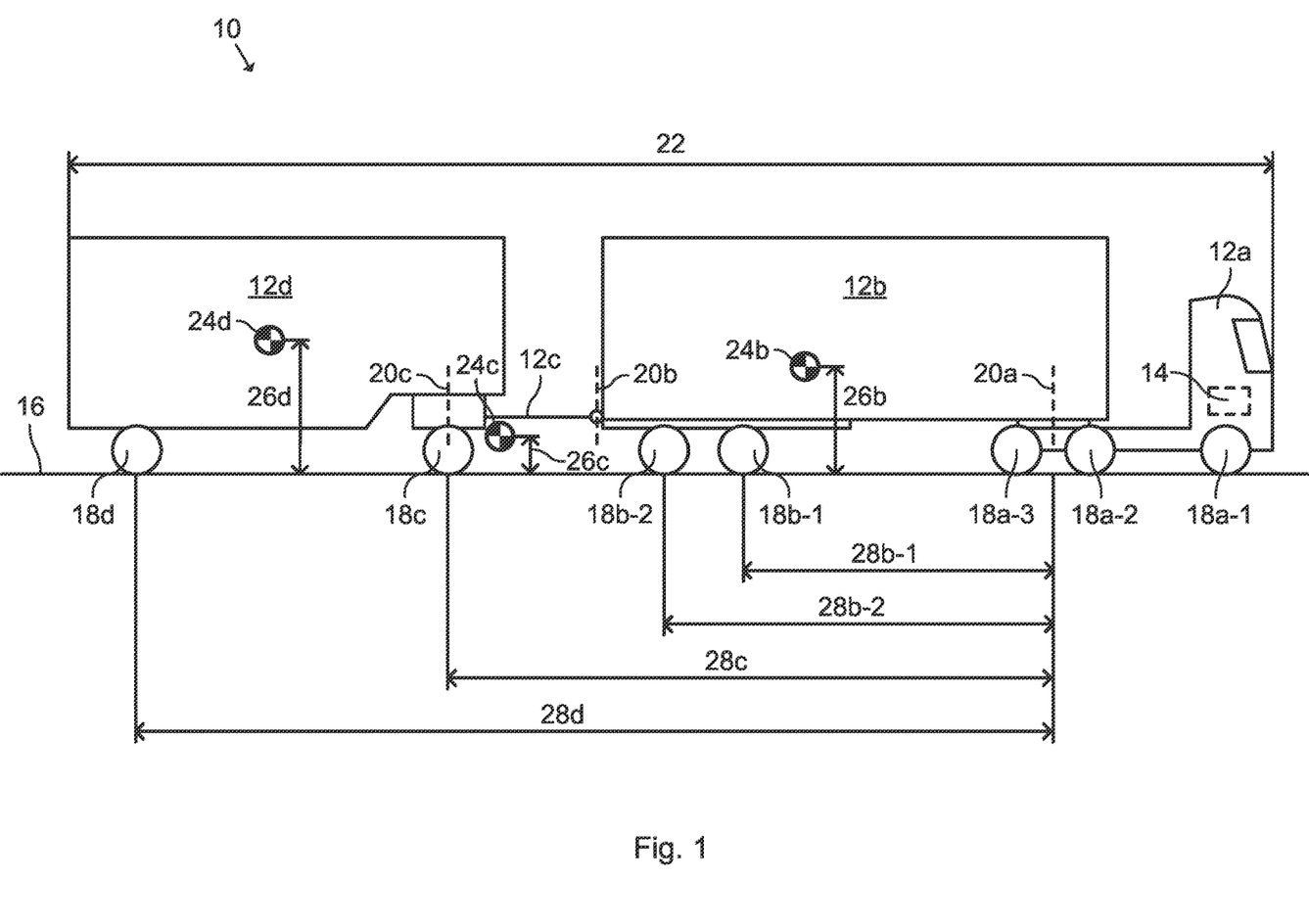
FIG. 1 schematically illustrates a side view of a vehicle combination according to the invention comprising a plurality of connected vehicle units and a leading vehicle unit comprising a steering system, FIG. 2 schematically illustrates the steering system in FIG. 1, FIG. 3 schematically illustrates a top view of the vehicle combination and lateral oscillations.

FIG. 1 schematically illustrates a side view of a vehicle combination 10 according to the invention. The vehicle combination 10 comprises a leading vehicle unit 12a and one or more connected vehicle units. The leading vehicle unit 12a comprises a steering system 14. The vehicle combination 10 travels on a road surface 16.

In this specific example, the vehicle combination 10 comprises a first connected vehicle unit 12b connected to the leading vehicle unit 12a, a second connected vehicle unit 12c connected to the first connected vehicle unit 12b, and a third connected vehicle unit 12d connected to the second connected vehicle unit 12c. The leading vehicle unit 12a comprises three wheel axles 18a-1, 18a-2 and 18a-3, the first connected vehicle unit 12b comprises a primary first wheel axle 18b-1 and a secondary first wheel axle 18b-2, the second connected vehicle unit 12c comprises a second wheel axle 18c, and the third connected vehicle unit 12d comprises a third wheel axle 18d. The wheel axes 18a-1, 18a-2, 18a-3, 18b-1, 18b-2, 18c and 18d may alternatively be referred to with reference numeral "18". The first connected vehicle unit 12b is rotatable relative to the leading vehicle unit 12a at a first vertical pivot 20a, the second connected vehicle unit 12c is rotatable relative to the first connected vehicle unit 12b at a second vertical pivot 20b, and the third connected vehicle unit 12d is rotatable relative to the second connected vehicle unit 12c at a third vertical pivot 20c. The vertical pivots 20a, 20b and 20c may alternatively be referred to with reference numeral "20".

FIG. 1 further shows a length 22 of the vehicle combination 10 from a front end of the leading vehicle unit 12a to a rear end of the last connected vehicle unit 12d. Moreover, FIG. 1 shows a first center of gravity 24b of the first connected vehicle unit 12b, a second center of gravity 24c of the second connected vehicle unit 12c, and a third center of gravity 24d of the third connected vehicle unit 12d. The centers of gravity 24a, 24b and 24c may alternatively be referred to with reference numeral "24". FIG. 1 further shows a first height 26b of the first center of gravity 24b from the road surface 16, a second height 26c of the second center of gravity 24c from the road surface 16, and a third height 26d of the third center of gravity 24d from the road surface 16. The heights 26b, 26c and 26d may alternatively be referred to with reference numeral "26".

Moreover, FIG. 1 shows a primary first distance 28b-1 between the first vertical pivot 20a and the primary first wheel axle 18b-1, a secondary first distance 28b-2 between the first vertical pivot 20a and the secondary first wheel axle 18b-2, a second distance 28c between the first vertical pivot 20a and the second wheel axle 18c, and a third distance 28d between the first vertical pivot 20a and the third wheel axle 18d. The distances 28b1-1, 28b-2, 28c and 28d may alternatively be referred to with reference numeral "28". The length 22, the centers of gravity 24, the heights 26, and the distances 28 constitute some of many examples of parameters associated with a setup of the vehicle combination 10. Upon coupling of the connected vehicle units 12b, 12c and 12d to the leading vehicle unit 12a, the connected vehicle units 12b, 12c and 12d may automatically send parameters, such as dimensions, mass and/or load information to the leading vehicle unit 12a, e.g. by means of Bluetooth®.

In the example in FIG. 1, the leading vehicle unit 12a is a truck, the first connected vehicle unit 12b is a semitrailer, the second connected vehicle unit 12c is a passive dolly, and the third connected vehicle unit 12d is a semitrailer. The illustrated vehicle combination 10 is thus an A-double (Truck-Semitrailer-Dolly-Semitrailer). The vehicle combination 10 may alternatively be, for example, a Tractor-ST (Tractor-Semitrailer), a Tractor-CAT (Truck-Center Axle Trailer), a Truck-FT (Truck-Full Trailer), a B-double (Tractor-Link Semitrailer-Semitrailer), a Tractor-ST-CAT (Tractor-Semitrailer-Center Axle Trailer), a Truck-Dolly-ST (Truck-Dolly-Semitrailer), a Truck-Duo CAT (Truck-Duo Center Axle Trailer) or a Truck-B-Double (Truck-Dolly-Link Semitrailer-Semitrailer).

In case the heights 26 are not known, default heights 26 may be defined in dependence of a type of connected vehicle unit 12b, 12c and 12d. For example, a first default height 26 may be defined for a trailer or a semitrailer (like the connected vehicle units 12b and 12d), and a second default height 26, smaller than the first default height 26, may be defined for a dolly (like the second connected vehicle unit 12c). Corresponding approximations can be made for other parameters of the connected vehicle units 12b, 12c and 12d.

Figure 2:
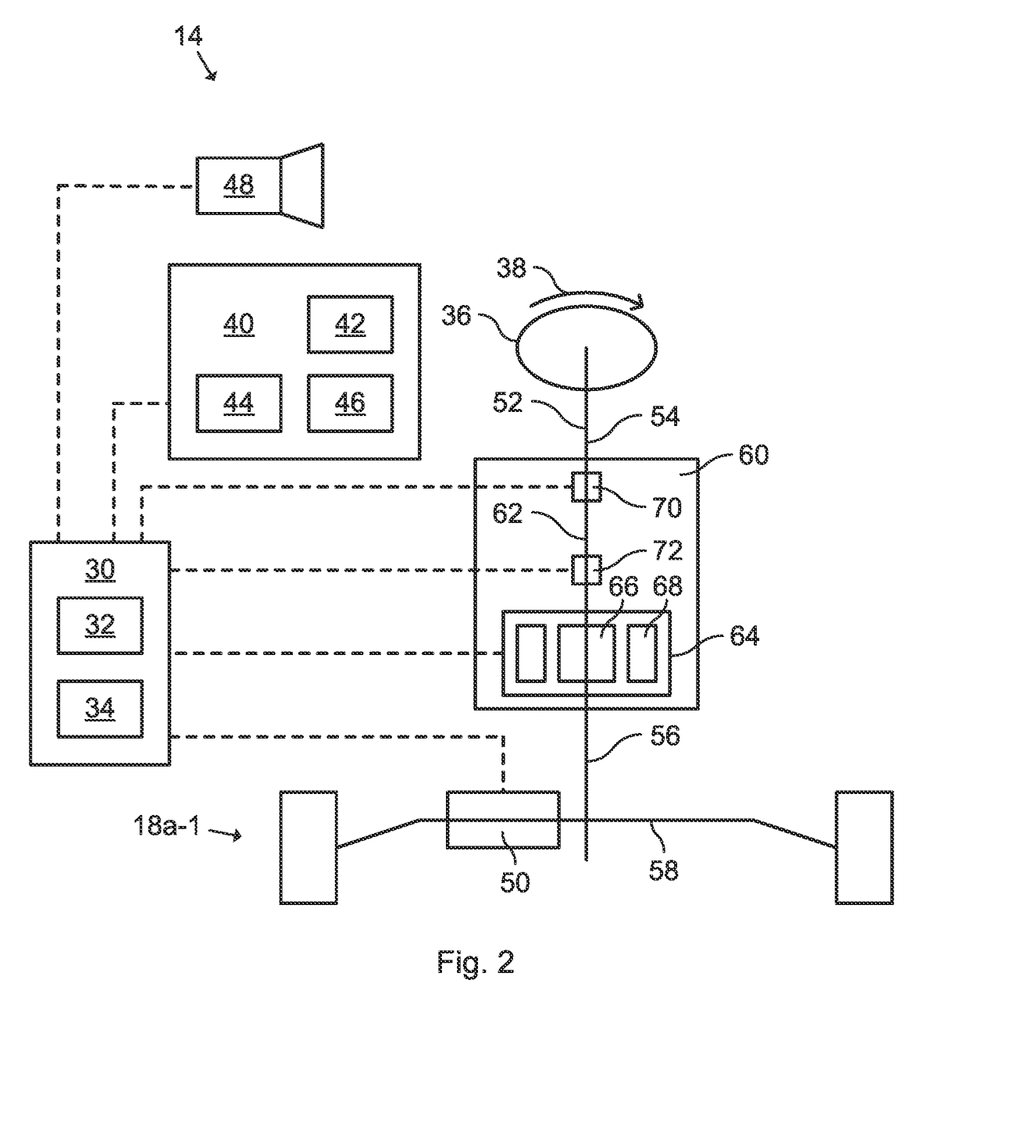

FIG. 2 schematically illustrates the steering system 14 in FIG. 1. The steering system 14 comprises a control system 30. The control system 30 in turn comprises a data processing device 32 and a memory 34. The memory 34 has a computer program stored thereon. The computer program comprises program code which, when executed by the data processing device 32 causes the data processing device 32 to perform, and/or command performance, of various steps according to the invention.

The steering system 14 of this example further comprises a steering wheel 36. By means of the steering wheel 36, a driver of the leading vehicle unit 12a can provide a steering input 38, i.e. by rotating the steering wheel 36. In case the leading vehicle unit 12a comprises an autonomous driving system, no steering wheel 36 needs to be provided. In this case, the steering input 38 may be constituted by a steering signal, e.g. generated by the control system 30.

The steering system 14 of this example further comprises a display 40. The display 40 may for example show stability information 42, a maximum speed 44 and/or a maximum steering angle 46 as described herein. To this end, the display 40 is in signal communication with the control system 30.

The steering system 14 of this example further comprises a loudspeaker 48. The loudspeaker 48 may for example issue an alarm to the driver. The loudspeaker 48 is in signal communication with the control system 30.

The steering system 14 of this example further comprises a hydraulic system 50 and a steering column 52 having an upper part 54 and a lower part 56. The hydraulic system 50 controls steering of a steered shaft 58 of the front wheel axle 18a-1 of the leading vehicle unit 12a. The hydraulic system 50 is in signal communication with the control system 30.

The steering system 14 of this example further comprises a steering assistance unit 60. The steering assistance unit 60 is configured to exert an assisting steering torque on the steering wheel 36. The steering assistance unit 60 can also release the assisting steering torque to the steering wheel 36 and provide a counteracting steering torque to the steering wheel 36. The steering assistance unit 60 of the specific example in FIG. 2 comprises a torsion bar 62 arranged between the upper part 54 and the lower part 56 of the steering column 52, an electric motor 64 having a rotor 66 and a stator 68, a first sensor 70 for measuring a rotational position of the upper part 54 of the steering column 52, and a second sensor 72 for measuring a rotational position of the lower part 56 of the steering column 52. The rotor 66 is connected to the lower part 56 of the steering column 52. Each of the first sensor 70, the second sensor 72 and the electric motor 64 is in signal communication with the control system 30.

Figure 3:
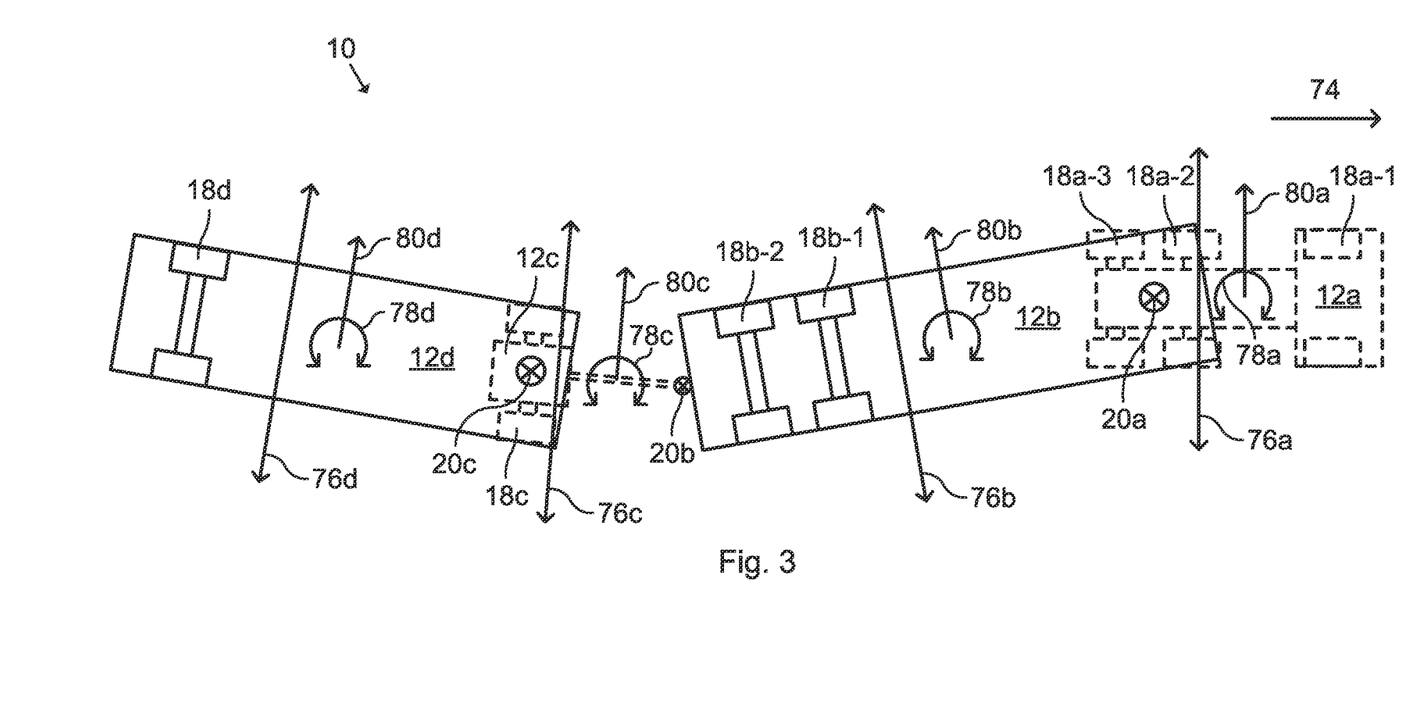

FIG. 3 schematically illustrates a top view of the vehicle combination 10 undergoing lateral oscillations during travel in a forward travel direction 74. The leading vehicle unit 12a and the second connected vehicle unit 12c are illustrated with dashed lines. In FIG. 3, a steering input 38 by the driver causes a lateral motion in the leading vehicle unit 12a which consequently introduces lateral forces at the vertical pivots 20a, 20b and 20c of the succeeding connected vehicle units 12b, 12c and 12d. Lateral oscillations of the leading vehicle unit 12a, the first connected vehicle unit 12b, the second connected vehicle unit 12c and the third connected vehicle unit 12d are shown with arrows 76a, 76b, 76c and 76d, respectively. The lateral oscillations 76a, 76b, 76c and 76d may alternatively be referred to with reference numeral "76". Yaw rates of the leading vehicle unit 12a, the first connected vehicle unit 12b, the second connected vehicle unit 12c and the third connected vehicle unit 12d are shown with arrows 78a, 78b, 78c and 78d, respectively. The yaw rates 78a, 78b, 78c and 78d may alternatively be referred to with reference numeral "78". Lateral accelerations of the leading vehicle unit 12a, the first connected vehicle unit 12b, the second connected vehicle unit 12c and the third connected vehicle unit 12d are shown with arrows 80a, 80b, 80c and 80d, respectively. The lateral accelerations 80a, 80b, 80c and 80d may alternatively be referred to with reference numeral "80". Under assumptions of small lateral slip and steady state turning, the lateral accelerations 80 may be approximated as a product of the velocity and the yaw rate 78 for each of the leading vehicle unit 12a and the connected vehicle units 12b, 12c and 12d. The longer the vehicle combination 10 is, the worse the lateral stability may be.

Figure 4:
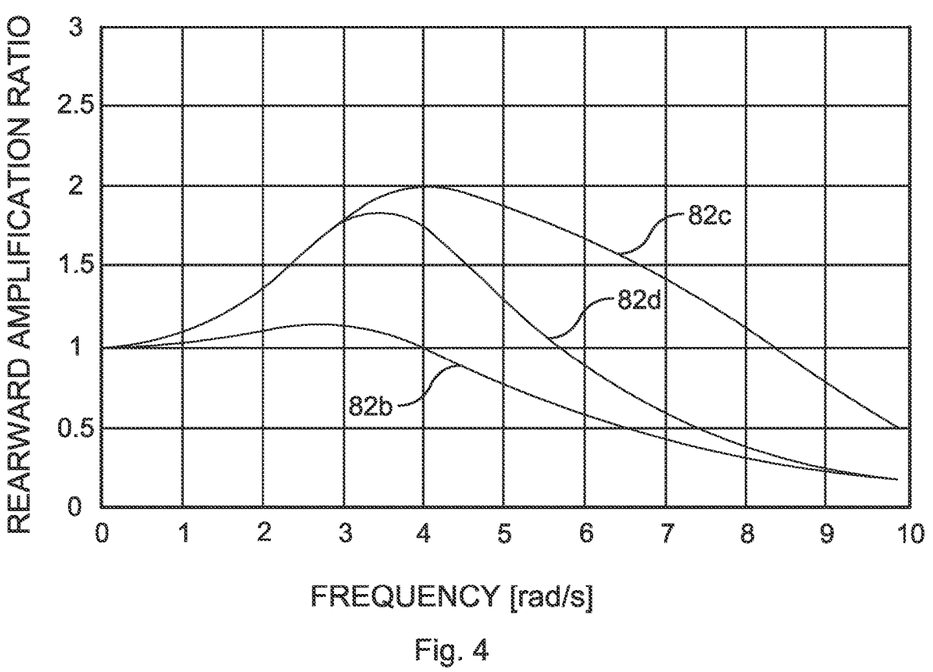
FIG. 4 schematically illustrates a frequency response diagram showing rearward amplification ratios of a motion variable as a function of steering input frequency.

FIG. 4 schematically illustrates a frequency response diagram showing rearward amplification ratios of a motion variable as a function of frequency of the steering input 38. The frequency response diagram may be obtained by means of calculations using one or more parameters associated with a setup of the vehicle combination 10 and a linear model of the vehicle combination 10. Alternatively, the frequency response diagram may be obtained by signal analysis while driving, e.g. of lateral accelerations 80, yaw rates 78, wheel speeds, roll-angle, etc. of the connected vehicle units 12b, 12c and 12d.

In the diagram in FIG. 4, yaw rate 78 is used as the motion variable. One example of an alternative motion parameter is lateral acceleration 80. In FIG. 4, the curve 82b represents a first rearward amplification ratio between the yaw rate 78b of the first connected vehicle unit 12b and the yaw rate 78a of the leading vehicle unit 12a. The curve 82c represents a second rearward amplification ratio between the yaw rate 78c of the second connected vehicle unit 12c and the yaw rate 78a of the leading vehicle unit 12a. The curve 82d represents a third rearward amplification ratio between the yaw rate 78d of the third connected vehicle unit 12d and the yaw rate 78a of the leading vehicle unit 12a. The rearward amplification ratio of a motion variable may also be referred to as a gain of the motion variable. The rearward amplification ratios 82b, 82c and 82d may alternatively be referred to with reference numeral "82".

If the steering input 38 has a frequency at which the rearward amplification ratio 82 for a motion variable is high for any of the connected vehicle units 12b, 12c and 12d, a magnitude of this motion variable in the leading vehicle unit 12a will be amplified to a high value in the this connected vehicle unit 12b, 12c and 12d. A rearward amplification ratio 82 of a motion variable close to one is therefore desired for each connected vehicle unit 12b, 12c and 12d since it means that the motion variable for the connected vehicle units 12b, 12c and 12d does not exceed that of the leading vehicle unit 12a. As a result, the risk of lateral instability related accidents (such as roll over) is lowered.

Figure 5:
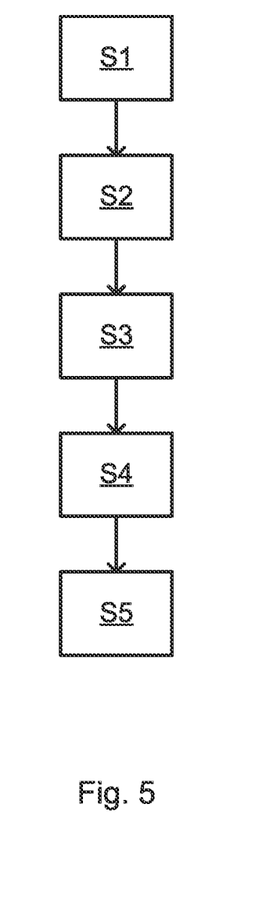
FIG. 5 is a flowchart outlining the general steps of the method according to the invention.

FIG. 5 is a flowchart outlining the general steps of a method of reducing or preventing lateral oscillations 76 of the connected vehicle units 12b, 12c and 12d according to the invention. The method comprises a step S1 of providing parameters associated with a setup of the vehicle combination 10. The parameters may for example include the length 22 of the vehicle combination 10, the centers of gravity 24 of each connected vehicle unit 12b, 12c and 12d, the heights 26 of the centers of gravity 24 and/or the distances 28. Various additional or alternative parameters associated with a setup of the vehicle combination 10, such as a geometry of the vehicle combination 10, may be provided. As an optional step, the method may further comprise determining stability information 42 of the vehicle combination 10 based on the parameters. The parameters may be input to the control system 30, e.g. manually from the driver and/or communicated from the connected vehicle units 12b, 12c and 12d.

The method further comprises a step S2 of determining, based on the parameters, critical frequencies having critical rearward amplification of a motion variable 78, 80 between the leading vehicle unit 12a and the connected vehicle units 12b, 12c and 12d. The critical frequencies may for example be obtained from a frequency response diagram. The frequency response diagram may in turn be obtained by means of calculations using parameters associated with a setup of the vehicle combination 10 and a linear model of the vehicle combination 10. The determination of the critical frequencies may be made by the control system 30.

According to one example, a common amplification threshold for the rearward amplification ratios 82 may be set for all connected vehicle units 12b, 12c and 12d. For example, if the common amplification threshold is set to 1.5, a range of critical frequencies of the steering input 38 will be approximately 2.3 rad/s to 6.7 rad/s in the example in FIG. 4.

According to a further example, a unique amplification threshold may be set for each connected vehicle unit 12b, 12c and 12d. The amplification threshold may be set in dependence of a parameter of a respective connected vehicle unit 12b, 12c and 12d, and/or in dependence of a type of connected vehicle unit 12b, 12c and 12d. For example, since the first height 26b of the first center of gravity 24b of the first connected vehicle unit 12b and the third height 26d of the third center of gravity 24d of the third connected vehicle unit 12d are substantially larger than the second height 26c of the second center of gravity 24c of the second connected vehicle unit 12c, and since the third distance 28d is larger than the primary first distance 28b-1 and the secondary first distance 28b-2, the amplification threshold of the first connected vehicle unit 12b may be set higher than the amplification threshold of the second connected vehicle unit 12c and the amplification threshold of the third connected vehicle unit 12d may be set higher than the amplification threshold of the first connected vehicle unit 12b. In this way, the critical frequencies can be handled in different modes. For example, the amplification thresholds for the first connected vehicle unit 12b, the second connected vehicle unit 12c and the third connected vehicle unit 12d may be set to 1.3, 1.9 and 1.1, respectively. This means that rearward amplification can be tolerated to a larger extent in the second connected vehicle unit 12c with a low center of gravity 24c. In the example in FIG. 4, there would then not be any critical frequencies of the steering input 38 for the first connected vehicle unit 12b (amplification threshold 1.3). For the second connected vehicle unit 12c (amplification threshold 1.9), a range of critical frequencies would then be approximately 3.5 rad/s to 4.5 rad/s in the example in FIG. 4. For the third connected vehicle unit 12d (amplification threshold 1.1), a range of critical frequencies would then be approximately 1 rad/s to 8 rad/s in the example in FIG. 4. Since the critical frequency range for the second connected vehicle unit 12c is a sub-range of the critical frequency range for the third connected vehicle unit 12d, and since there are no critical frequencies for the first connected vehicle unit 12b in this example, the critical frequency range for all connected vehicle units 12b, 12c and 12d may then be set to 1 rad/s to 8 rad/s in the example in FIG. 4.

As an optional step, the method may further comprise determining stability information 42 including data associated with the critical frequencies. As a further optional step, the method may comprise determining a maximum speed 44 of the vehicle combination 10 based on the critical frequencies. According to one non-limiting illustrative example, if critical frequencies have a maximum rearward amplification ratio 82 of over 2, a maximum speed 44 may be set to 85 km/h, and if critical frequencies have a maximum rearward amplification ratio 82 of between 1.5 and 2, a maximum speed 44 may be set to 80 km/h.

As a further optional step, the method may comprise determining a maximum steering angle 46 for a given speed of the vehicle combination 10 based on the critical frequencies. According to one non-limiting illustrative example, if critical frequencies have a maximum rearward amplification ratio 82 of over 2, a maximum steering angle 46 may be set to 10 degrees (from a 0 degree position for straight travel) at speeds above 80 km/h, and if critical frequencies have a maximum rearward amplification ratio 82 of between 1.5 and 2, a maximum steering angle 46 may be set to 20 degrees at speeds below 80 km/h.

The method further comprises a step S3 of monitoring the steering input 38 to the leading vehicle unit 12a. The steering input 38 may be continuously monitored during travel of the vehicle combination 10. Alternatively, the steering input 38 may be monitored at speeds above a threshold speed. In any case, the monitoring may be made by the control system 30.

The method further comprises a step S4 of determining whether the steering input 38 excites any of the critical frequencies. The determination of whether the steering input 38 excites any of the critical frequencies may be made using a detection algorithm and/or a bandpass filter having a bandwidth corresponding to the critical frequencies. Such detection algorithm and bandpass filter may be implemented in the control system 30. For example, the steering input 38 may be analyzed to detect excitations within a critical frequency range by means of a bandpass filter with thresholds on a steering angle or steering angle rate. Information from the detection algorithm may be used to also active other systems in the vehicle combination 10 to counteract lateral oscillations 76, such as reactive brake systems or steering systems.

The method further comprises a step S5 of automatically triggering a countermeasure for reducing or preventing lateral oscillations 76b, 76c and 76d of the connected vehicle units 12b, 12c and 12d upon determining that the steering input 38 excites any of the critical frequencies. One example of a countermeasure is a force feedback to the steering wheel 36. Such force feedback can be provided by disabling a supporting steering torque to the steering wheel 36 by means of the steering assistance unit 60. Such force feedback can alternatively be provided by actively generating a counteracting steering torque to the steering wheel 36 by means of the steering assistance unit 60 that counteracts the steering input 38. In each case, the force feedback notifies the driver that the steering input 38 excites a critical frequency at which there is a critical rearward amplification to one or more of the connected vehicle units 12b, 12c and 12d. Additionally, the force feedback at least to some extent hinders the driver from continuing to provide a steering input 38 exciting a critical frequency. In any case, it will be very difficult for the driver to maintain a steering input 38 with a constant frequency during entrance of the force feedback. For this reason, the frequency of the steering input 38 will most likely change due to the force feedback. When the critical frequencies are no longer excited by the steering input 38, lateral oscillations 76b, 76c and 76d of the connected vehicle units 12b, 12c and 12d will no longer be generated. The lateral stability of the vehicle combination 10 is thereby improved.

A further example of a countermeasure is to provide audible feedback to the driver upon determining that the steering input 38 excites any of the critical frequencies. The audible feedback may be provided by the loudspeaker 48.

A further example of a countermeasure is to provide visual feedback to the driver upon determining that the steering input 38 excites any of the critical frequencies. The visual feedback may be provided by the display 40. The display 40 may be a touchscreen by means of which the driver can input parameters associated with a setup of the vehicle combination 10. Based on the force feedback, the audible feedback or the visual feedback, the driver can for example decide to make less aggressive steering inputs 38 for a lane change.

One specific example of a countermeasure is to display the stability information 42 including data associated with the critical frequencies on the display 40. For example, a value of a maximum rearward amplification ratio 82 may be displayed. In the example in FIG. 4, this value would be 2. Alternatively, or in addition, a general stability value may be shown on the display 40 for each connected vehicle unit 12b, 12c and 12d. For example, with reference to FIG. 4 and the above example, a value "good" may be displayed for the first connected vehicle unit 12b since the first rearward amplification ratio 82*b* does exceed an amplification threshold of 1.3, a value "bad" or a warning may be displayed for each of the second connected vehicle unit 12*c* and the third connected vehicle unit 12*d* since the second rearward amplification ratio 82*c* and the third rearward amplification ratio 82*d* each exceeds 1.1 and 1.5, respectively. Alternatively, or in addition, a general stability value indicating the maximum rearward amplification ratio 82 of each connected vehicle unit 12*b*, 12*c* and 12*d* may be shown on the display 40, i.e. 1.2, 2 and 1.8 in the example in FIG. 4. The driver can be notified of the stability information 42 on the display 40 when a critical frequency is excited. By means of the stability information 42, the driver can avoid steering inputs 38 exciting critical frequencies.

A further example of a countermeasure is to display the maximum speed 44 on the display 40. The maximum speed 44 may always be available for display, e.g. by navigating through a menu on the display 40. Alternatively, or in addition, a warning may be issued as a countermeasure if the vehicle combination 10 exceeds the maximum speed 44.

A further example of a countermeasure is to display the maximum steering angle 46 for a given speed of the vehicle combination 10. For example, maximum steering angles 46 may be displayed for 70 km/h, 75 km/h and 80 km/h. Alternatively, or in addition, a maximum steering angle 46 for a particular speed may be displayed when this speed is reached. Alternatively, or in addition, a warning may be issued (e.g. on the display 40) if the driver overshoots the maximum steering angle 46 at a particular speed of the vehicle combination 10.

Common to all the above countermeasures is that certain types of steering inputs 38 exciting the critical frequencies can be avoided. In this way, also critical excitations of the vehicle combination 10 can be avoided to reduce or prevent lateral oscillations 76*b*, 76*c* and 76*d* of the connected vehicle units 12*b*, 12*c* and 12*d* before these occur. Consequently, safety of the vehicle combination 10 is improved.

In case a countermeasure is generated, further information of the scenario may be given to the driver. Such information may be presented on the display 40 when the vehicle combination 10 has been parked. A pop-up window may be presented on the display 40 giving information about what caused a critical frequency to be excited and giving advise on how to avoid such excitations in the future.

It is to be understood that the present invention is not limited to the embodiments described above and illustrated in the drawings; rather, the skilled person will recognize that many changes and modifications may be made within the scope of the appended claims.

The invention claimed is:

1. A method of reducing or preventing lateral oscillations of at least one connected vehicle unit of a vehicle combination comprising the at least one connected vehicle unit connected to a leading vehicle unit, the method comprising:
   providing, by a computing device, one or more parameters associated with a setup of the vehicle combination;
   determining, by the computing device, based on the one or more parameters, one or more critical frequencies having critical rearward amplification of a motion variable between the leading vehicle unit and the at least one connected vehicle unit;
   monitoring, by the computing device, a steering input to the leading vehicle unit;
   determining, by the computing device, that the steering input excites any of the one or more critical frequencies; and
   in response to the determining, automatically triggering, by the computing device, a countermeasure to avoid or reduce the steering input exciting any of the one or more critical frequencies, for proactively reducing or preventing lateral oscillations of the at least one connected vehicle unit.

2. The method of claim 1, wherein the critical rearward amplification is defined as a rearward amplification ratio of at least 1.1 between the at least one connected vehicle unit and the leading vehicle unit.

3. The method of claim 1, wherein the motion variable is lateral movement, lateral acceleration, yaw, yaw rate, roll angle, or roll rate.

4. The method of claim 1, wherein at least one of the one or more parameters is associated with a geometry of the vehicle combination.

5. The method of claim 1, further comprising determining stability information of the vehicle combination based on the one or more parameters.

6. The method of claim 5, wherein the countermeasure comprises communicating the stability information to a driver or to an autonomous driving system of the leading vehicle unit.

7. The method of claim 1, further comprising determining a maximum speed of the vehicle combination based on the one or more critical frequencies.

8. The method of claim 7, wherein the countermeasure comprises communicating the maximum speed to a driver or to an autonomous driving system of the leading vehicle unit, or warning the driver if a current speed of the leading vehicle unit exceeds the maximum speed.

9. The method of claim 1, further comprising determining a maximum steering angle for a given speed of the vehicle combination based on the one or more critical frequencies.

10. The method of claim 9, wherein the countermeasure comprises communicating the maximum steering angle at the given speed to a driver or to an autonomous driving system of the leading vehicle unit, or warning the driver if the current steering angle of the leading vehicle unit exceeds the maximum steering angle at the given speed.

11. The method of claim 1, wherein the countermeasure comprises a force feedback to a steering wheel of the leading vehicle unit.

12. The method of claim 1, wherein the countermeasure comprises disabling an assisting steering torque on a steering wheel of the leading vehicle unit.

13. The method of claim 1, wherein the countermeasure comprises actively generating a counteracting steering torque on a steering wheel of the leading vehicle unit that counteracts the steering input.

14. A control system for reducing or preventing lateral oscillations of at least one connected vehicle unit of a vehicle combination comprising the at least one connected vehicle unit connected to a leading vehicle unit, the control system comprising:
   at least one data processing device; and
   at least one memory having a computer program stored thereon, the computer program comprising program code which, when executed by the at least one data processing device, causes the at least one data processing device to:
   provide one or more parameters associated with a setup of the vehicle combination;
   determine, based on the one or more parameters, one or more critical frequencies having critical rearward amplification of a motion variable between the leading vehicle unit and the at least one connected vehicle unit;

monitor a steering input to the leading vehicle unit;
determine that the steering input excites any of the one or more critical frequencies; and
in response to the determining, automatically trigger a countermeasure to avoid or reduce the steering input exciting any of the one or more critical frequencies, for proactively reducing or preventing lateral oscillations of the at least one connected vehicle unit.

15. The control system of claim 14, wherein the critical rearward amplification is defined as a rearward amplification ratio of at least 1.1, between the at least one connected vehicle unit and the leading vehicle unit.

16. The control system of claim 14, wherein the motion variable is lateral movement, lateral acceleration, yaw, yaw rate, roll angle, or roll rate.

17. The control system of claim 14, wherein at least one of the one or more parameters is associated with a geometry of the vehicle combination.

18. The control system of claim 14, wherein the computer program comprises program code which, when executed by the at least one data processing device, causes the at least one data processing device to:
determine stability information of the vehicle combination based on the one or more parameters.

19. The control system of claim 18, wherein the computer program comprises program code which, when executed by the at least one data processing device, causes the at least one data processing device to:
command communication of the stability information to a driver or to an autonomous driving system of the leading vehicle unit.

20. The control system of claim 14, wherein the computer program comprises program code which, when executed by the at least one data processing device, causes the at least one data processing device to:
determine a maximum speed of the vehicle combination based on the one or more critical frequencies.

21. The control system of claim 20, wherein the computer program comprises program code which, when executed by the at least one data processing device, causes the at least one data processing device to:
command communication of the maximum speed to a driver or to an autonomous driving system of the leading vehicle unit, or commanding issuance of a warning to the driver, if a current speed of the leading vehicle unit exceeds the maximum speed.

22. The control system of claim 14, wherein the computer program comprises program code which, when executed by the at least one data processing device, causes the at least one data processing device to:
determine a maximum steering angle for a given speed of the vehicle combination based on the one or more critical frequencies.

23. The control system of claim 22, wherein the computer program comprises program code which, when executed by the at least one data processing device, causes the at least one data processing device to:
command communication of the maximum steering angle at the given speed to a driver or to an autonomous driving system of the leading vehicle unit, or commanding issuance of a warning to the driver, if the current steering angle of the leading vehicle unit exceeds the maximum steering angle at the given speed.

24. A steering system comprising:
a control system for reducing or preventing lateral oscillations of at least one connected vehicle unit of a vehicle combination comprising the at least one connected vehicle unit connected to a leading vehicle unit, the control system comprising:
at least one data processing device; and
at least one memory having a computer program stored thereon, the computer program comprising program code which, when executed by the at least one data processing device, causes the at least one data processing device to:
provide one or more parameters associated with a setup of the vehicle combination;
determine, based on the one or more parameters, one or more critical frequencies having critical rearward amplification of a motion variable between the leading vehicle unit and the at least one connected vehicle unit;
monitor a steering input to the leading vehicle unit;
determine whether the steering input excites any of the one or more critical frequencies; and
automatically trigger a countermeasure for reducing or preventing lateral oscillations of the at least one connected vehicle unit upon determining that the steering input excites any of the one or more critical frequencies.

25. The steering system of claim 24, further comprising a steering wheel and a steering assistance unit arranged to exert an assisting steering torque on the steering wheel.

26. The steering system of claim 25, wherein the computer program comprises program code which, when executed by the at least one data processing device, causes the at least one data processing device to:
command the steering assistance unit to issue a force feedback to the steering wheel upon determining that the steering input excites any of the one or more critical frequencies.

27. The steering system of claim 25, wherein the computer program comprises program code which, when executed by the at least one data processing device, causes the at least one data processing device to:
command the steering assistance unit to disable an assisting steering torque on the steering wheel upon determining that the steering input excites any of the one or more critical frequencies.

28. The steering system of claim 25, wherein the computer program comprises program code which, when executed by the at least one data processing device, causes the at least one data processing device to:
command the steering assistance unit to actively generate a counteracting steering torque on the steering wheel that counteracts the steering input upon determining that the steering input excites any of the one or more critical frequencies.

* * * * *